Nov. 21, 1967  G. F. HANKS ET AL  3,353,941
METHOD OF MELTING GLASS
Filed May 29, 1964

INVENTOR.
GEORGE F. HANKS
ALEXANDER L. BRACKEN JR.
BY
McCormick, Paulding & Huber
ATTORNEYS

United States Patent Office 3,353,941
Patented Nov. 21, 1967

3,353,941
METHOD OF MELTING GLASS
George F. Hanks, Avon, and Alexander L. Bracken, Jr., West Hartford, Conn., assignors to Emhart Corporation, a corporation of Connecticut
Filed May 29, 1964, Ser. No. 371,239
2 Claims. (Cl. 65—32)

ABSTRACT OF THE DISCLOSURE

A method of making glass in an elongated furnace or unit melter involving the step of introducing a layer of air over the body of molten glass in the melter so as to prevent reaction between the combusting mixture introduced through burners at the top of the furnace and the molten glass.

---

This invention relates to an improved apparatus and method of making glass, and deals more particularly with a glass melting furnace of relatively low glass making capacity wherein a reserve bath of molten glass is used to melt the batch of glass making ingredients in a continuous manner.

It is well known that relatively small or low capacity continuous glass melting furnaces of the type disclosed in the U.S. patent to Lyle, No. 2,890,547 of June 16, 1959 are characterized by low thermal efficiencies in that the ratio of heating fuel required per ton of glass produced is disproportionately higher than it would be with a furnace of relatively large productive capacity. This inherent drawback of the small glass melting furnace can be attributed in large part to the relatively large quantity of molten glass required to properly fine even the small batch of glass making materials associated with a furnace of low capacity. Since the quantity of molten glass in the reserve bath is directly related to the amount of heat required to maintain its temperature, it follows that any improvement in the manner of heating the bath will result in a marked increase in thermal efficiency of such a low capacity glass melting furnace.

It is a feature of such low capacity furnaces that the means for heating the bath are in the form of fuel burners which fire directly into the space above the bath. As shown in the above identified patent, these burners must be located in rather closely spaced vertical relation to the surface of the bath in order to avoid wasting the heat generated thereby. It has been found that the combusting mixture from these burners tend to react with the molten glass at the surface, and with the gases liberated at the surface, to form a layer or blanket of foam which insulates the bath from the source of heat.

It is the general object of the present invention to minimize or wholly prevent the formation of this layer of foam in order to improve the thermal efficiency of a low capacity continuous glass melting furnace.

A more specific object of the invention is to provide a non-insulating layer of gas between the glass and the combustion mixture emanating from the burners so as to prevent the combusting mixture from reacting with glass and forming the blanket of foam, or at least a substantial part thereof.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Figure 1:
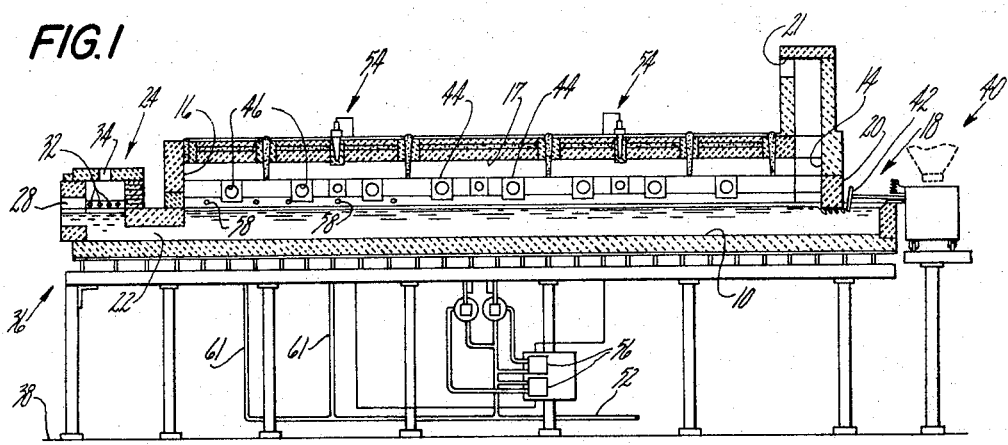
FIG. 1 is a longitudinal vertical section through a low capacity glass melting furnace of the continuous type constructed in accordance with this invention.

Turning first to a brief description of the conventional part of the furnace shown in FIG. 1, the illustrative apparatus is seen to comprise a relatively long and narrow horizontal furnace channel defined by a horizontal flat bottom or hearth 10, a pair of longitudinal side walls 12, 12 and end wall 14 at the rear or charging end, and a front end wall 16 at the opposite or delivery end of the channel. The furnace structure also includes a roof 17 which rests on the upper surfaces of the side walls 12, 12. The rear end wall 14 is cut away at its bottom to accommodate a mantle block 20 to be described.

A doghouse 18 is conventionally arranged at the rear end of the furnace channel and its bottom is defined by the bottom 10 so that the doghouse chamber is in communication with the furnace channel beneath the mantle block 20 at the end wall 14 of the furnace. A stack is conventionally located adjacent the doghouse as shown at 21.

The front end of the furnace channel is in open communication at its middle portion with a horizontal throat passage 22 leading to the lower part of a glass conditioning or forehearth chamber 24, the throat passage 22 being located below the level 26 of the surface of the molten glass in the furnace channel and in the connected conditioning chamber. As shown the bottoms of each of these chambers, the furnace channel, the doghouse and the conditioning chamber, are all at the same level and the bottom of the throat passage is a continuation of the channel bottom 10. The conditioning chamber may be laterally enlarged forwardly of the throat passage and in the example shown an opening 28 is provided in a forward vertical wall 30 thereof, generally opposite the throat to allow the glass to flow into a glass feeder or the like. The conditioning chamber may be provided with its own independent heating means represented by the burner ports 32, 32 arranged in the side wall thereof, and an exhaust opening or vent 34 is provided in a top portion of that structure. The details of the example are not intended to be limited, however, and the conditioning chamber may be of any suitable size or shape according to the particular requirements. For example, more than one glass outflow opening 28 may be provided for removal of glass therefrom or glass might be removed by hand gathering or in any other known way.

A supporting frame structure 36 may be provided to support the furnace and connected parts at a desired height above a factory floor or other main supporting surface 38.

A batch charger is shown more or less diagrammatically at 40 and is operatively associated with the doghouse 18. This charger is or may be similar to that disclosed in the aforementioned patent, having a glass stirring blade or rabble 42 which is moved in an orbital path lying in a vertical plane so that the blade is alternately dipped into the glass bath to impel the surface layer forward and then raised out of the bath to return for another dipping motion. The batch charger also includes suitable means for depositing the batch on the surface of the glass bath behind the rabble 42 and the batch so deposited is caused to move forwardly by the forward dipping motion of the rabble so that the dry batch is enfolded by the liquid bath in a very efficient mixing action. It will be apparent that other types of batch chargers might be used but it has been found that the type just referred to gives results which are entirely satisfactory in a glass melting furnace of the present invention.

The longitudinal side walls 12, 12 include burner blocks 44, 44 which define burner ports 46, 46 therein. These blocks 42, 42 may be of any predetermined number and may be spaced apart longitudinally in the furnace as deemed best for the heating action and result desired. In the example shown, eight equidistantly spaced apart burner blocks 44, 44 are provided in each of the longitudinal side walls 12, 12 (one side shown in FIG. 2).

Figure 2:
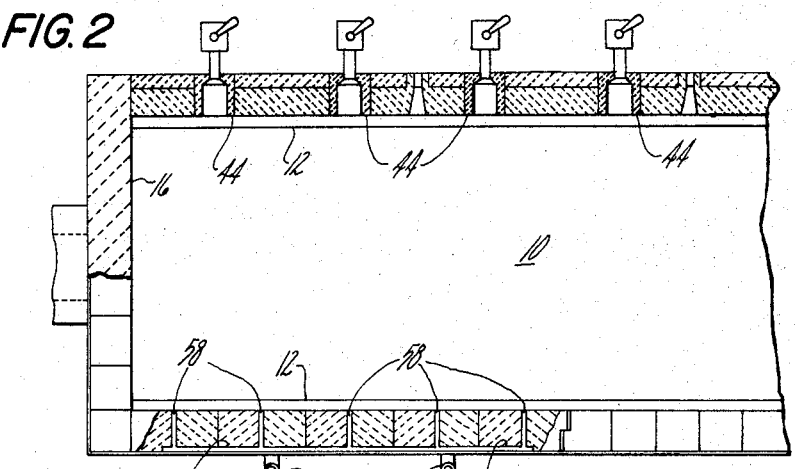
FIG. 2 is an enlarged horizontal section through the left-hand portion of the FIG. 1 furnace, showing the fining zone thereof.
Figure 3:
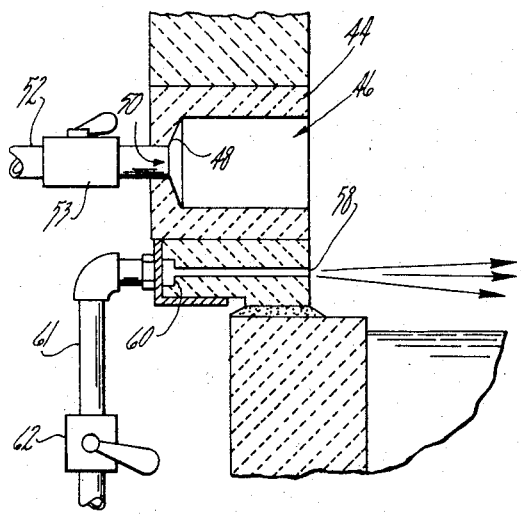
FIG. 3 is an enlarged multi-plane vertical cross sectional view at one side of the furnace of FIG. 1 showing a burner block and an air inlet port.

Each burner port 46 extends through its associated block 44 from the outer to the inner face thereof as shown in FIGS. 2 and 3. An outer end portion 48 of each port 46 is of reduced diameter to receive a fuel nozzle 50 and the nozzle is preferably fitted therein in an airtight manner from the exterior of the furnace so that the fuel supplied thereto by the piping means, indicated generally at 52, will burn properly at the nozzle. The term "fuel" as used herein is meant to include a mixture of air, supplied to the fuel control unit by said piping means 52 and a combustible gaseous or liquid fuel, supplied through fuel lines (not shown) directly to each burner. The remaining portion of each burner port 46 may be considerably larger in cross section as shown to promote combustion in the burner port and at the inner face of the burner block.

The piping means 52 for delivering the combustion air to each nozzle 50 is provided with adjustable valves 53, 53 for throttling each burner individually so that the temperature in the furnace can be manually adjusted to provide any suitable temperature gradients therein as disclosed in the aforementioned patent. Also in this vein, two thermoresponsive sensors 54, 54 are provided in the roof 17 of the furnace to control two suitable controller units 56, 56 which turn the burners on or off in two zones according to the predetermined temperature ranges associated with each zone.

In operation, the above described glass melting furnace maintains a bath of molten glass in the channel as a batch of glass-making ingredients is fed into the furnace by the batch charger as mentioned previously. A quantity of fined glass is adapted to be removed from the conditioning chamber in proportion to the amount of batch inserted by the charger and the level of the reserve bath is maintained at a level shown in FIG. 1 by controlling the amount of batch so introduced. The bath is heated by the burners as above described and in order to reduce the fuel required to maintain the bath at the proper temperature these burners are located in closely spaced vertical relation to the surface of the bath, as best shown in FIG. 3, so that they fire directly into the space thereabove. As mentioned, the combusting mixture from these burners tends to react with the molten glass at the surface of the bath, and with the gases liberated at the surface during the fining process. This reaction forms an insulatory layer of foam which can be likened to a blanket which prevents some of the heat generated by the burner from reaching the bath.

The present invention seeks to avoid or at least to minimize the adverse effects of this insulatory blanket by preventing its formation, or a substantial portion thereof, by placing a layer of air or other gas between the products of combustion and the bath.

As shown, the means for introducing the air next to the bath comprises a series of holes or bores defined in the side walls, 12, 12. Each one of the holes terminates in an outlet 58 at the inner face of the wall which outlet is located between the surface of the glass bath and a horizontal line connecting the lower portions of the burners 46, 46.

As shown, these outlets 58, 58 are connectible with a source of gas under pressure as indicated by a manifold 60 defined between the outer surface of the wall 12 and the vertical flange of an angle bracket which supports the wall. The manifold 60 is in turn connected to two vertical pipes 61, 61 which are tapped into the source of combustion air as shown in FIG. 1.

In order to match the flow of air discharged from the outlets 58, 58 with the intensity of the flame generated at the burners, a valve 62 is provided in each pipe 61 to permit the air flow to be regulated for this purpose. It will, of course, be apparent that each discharge outlet 58 could have its own flow regulating means, but it has been found that the two valves 62, 62 are entirely adequate for regulating the air in the furnace described in the aforementioned patent.

As noted, the ready supply of combustion air provides a convenient source of air for use as a gas to prevent the formation of the foam. It has been found that the quantity of gas required, when air is used, is relatively small as compared with the quantity of air required for combustion and, therefore, in view of the ready availability of air for combustion purposes in the furnace, it has been found that the manifold 60 can draw its air from this source without deleterious effect upon the operation of the burners.

Finally, it should be noted that these air discharge outlets are shown in only a portion of the furnace, namely that portion or zone in which most of the fining of the glass takes place. It will be apparent that these outlets might also be provided throughout the furnace, including that portion or zone where the dry batch or charge is first mixed with the molten glass. It has been found, however, that the greatest benefits in thermal efficiency are to be derived from incorporating these outlets in the fining zone of the above described furnace.

The invention claimed is:
1. The method of making glass in an elongated furnace having a rear end adapted to receive batches of glass-making ingredients and a front end adapted to discharge quantities of molten glass, comprising the steps of establishing a body of molten glass in the furnace, supplying heat to the furnace at burners disposed above the body of glass at points spaced along the length of said furnace by introducing a pre-mixed combusting mixture of fuel and air, introducing air under pressure to the furnace between the surface of the body of glass and the burners to provide a protective layer of air over the body of molten glass which inhibits reaction of the combusting mixture with the glass to form foam, withdrawing molten glass from the front end of the furnace, and adding batches of glass making ingredients at the rear end of the furnace to maintain a substantially constant depth for the body of molten glass.

2. The glass making method set forth in claim 1 wherein the greatest amount of heat is introduced at the burners nearer the rear end of the furnace to define a fining zone therein, and wherein the introduction of air to provide a protective layer is limited to said fining zone.

References Cited

UNITED STATES PATENTS

| 1,611,328 | 12/1926 | Arbogast | 65—179 XR |
| 2,767,518 | 10/1956 | Schmid | 65—346 |
| 3,137,559 | 6/1964 | Van Praet | 65—343 |

FOREIGN PATENTS

| 819,834 | 9/1959 | Great Britain. |
| 904,156 | 8/1962 | Great Britain. |

DONALL H. SYLVESTER, *Primary Examiner.*

F. W. MIGA, *Assistant Examiner.*